TAPE RECORDER AMPLIFIER FOR SIGNALS FROM TWO DIFFERENT SOURCES

Filed Dec. 21, 1964 3 Sheets-Sheet 1

INVENTORS
KENNARD E. VOYLES
ANTANAS R. STAPULIONIS
BY Benn Jackson Bottcher & Dunner
ATTYS.

Sept. 24, 1968 K. E. VOYLES ET AL 3,403,232

TAPE RECORDER AMPLIFIER FOR SIGNALS FROM TWO DIFFERENT SOURCES

Filed Dec. 21, 1964 3 Sheets-Sheet 2

INVENTORS
KENNARD E. VOYLES
ANTANAS R. STAPULIONIS

BY Brown Jackson Boettcher & Dienner

ATTYS.

TAPE RECORDER AMPLIFIER FOR SIGNALS FROM TWO DIFFERENT SOURCES

Filed Dec. 21, 1964 3 Sheets-Sheet 3

INVENTORS
KENNARD E. VOYLES
ANTANAS R. STAPULIONIS
BY Brown Jackson Boettcher & Dienner
ATTYS.

United States Patent Office 3,403,232
Patented Sept. 24, 1968

3,403,232
TAPE RECORDER AMPLIFIER FOR SIGNALS FROM TWO DIFFERENT SOURCES

Kennard E. Voyles, St. Joseph, and Antanas R. Stapulionis, Benton Harbor, Mich., assignors to V-M Corporation, Benton Harbor, Mich., a corporation of Michigan Filed Dec. 21, 1964, Ser. No. 419,773
7 Claims. (Cl. 179—100.2)

ABSTRACT OF THE DISCLOSURE

A tape recorder including a compensating stage for attenuating the low frequency signals of a relatively flat response device, such as a microphone, to permit simultaneous recording of such signals with signals from a device such as a recorder playback head of different frequency response with a single preamplifier stage.

This invention relates to preamplifiers, and more specifically to a novel means for providing a single amplification stage for signals from two apparently incompatible signal sources. The device is particularly useful in tape recorders of the type in which signals from two separate sources, such as a playback head and a microphone, are to be recorded simultaneously.

There are in the field several different uses of tape recorder devices which require the recording of signals from two separate sources. In one known application in which the tape recorder is used as an aid in language instruction, the instructor records information on a first tape channel separated by intervals of no recording, and the student repeatedly listens to such recorded material in an attempt to learn the proper pronunciation of the recorded words. After several playbacks, the student then adjusts the machine so that he may record his attempts on a second channel during the time intervals immediately following the message recorded by the instructor on the first channel. Since commercially available tape normally has four channels, by reversing the tape, a second pair of channels are provided which may be used in a similar manner.

In yet another application, instrumental music may be recorded on one channel, and during a subsequent playback the singer may record his voice on the second channel in accompaniment to the music.

In each of such arrangements, one set of signals is provided by the recorder playback head, and the other signal set is received over a microphone. In known systems, because of the apparent incompatible nature of the signal sets, each signal set has been transmitted over a separate preamplifier stage for correction and matching with each other prior to further amplification. Such systems therefore require two separate and distinct preamplifier stages. This duplication of components naturally increases cost, size, and maintenance requirements, and it is therefore an object of the present invention to provide a system which includes inexpensive means for transmitting and amplifying the signal outputs of two apparently incompatible sources.

It is a specific object of this invention to provide a means for mixing the signals of two or more incompatible signal sources by using only one preamplifier stage for both sources.

Figure 2:
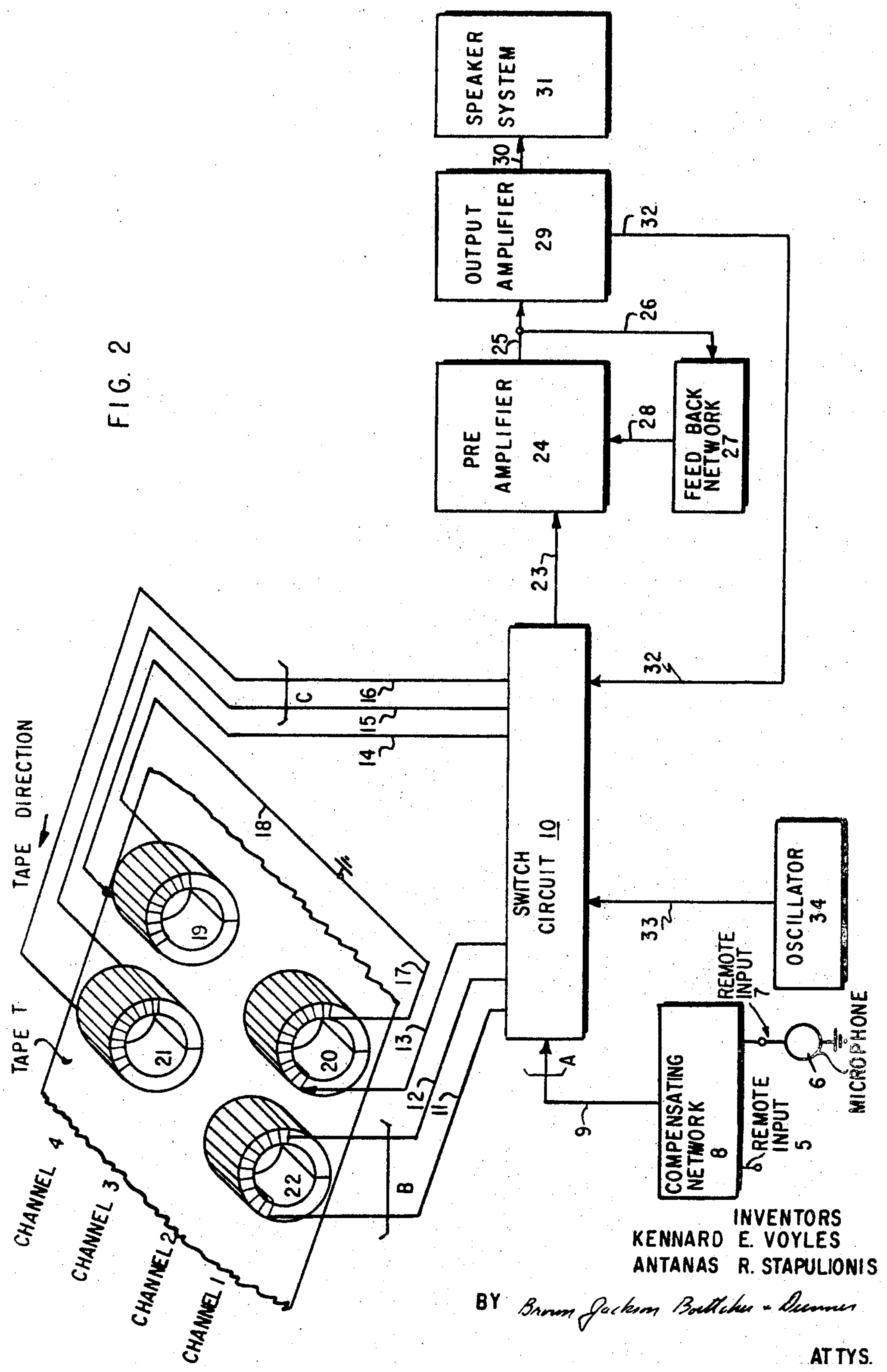
Figure 3:
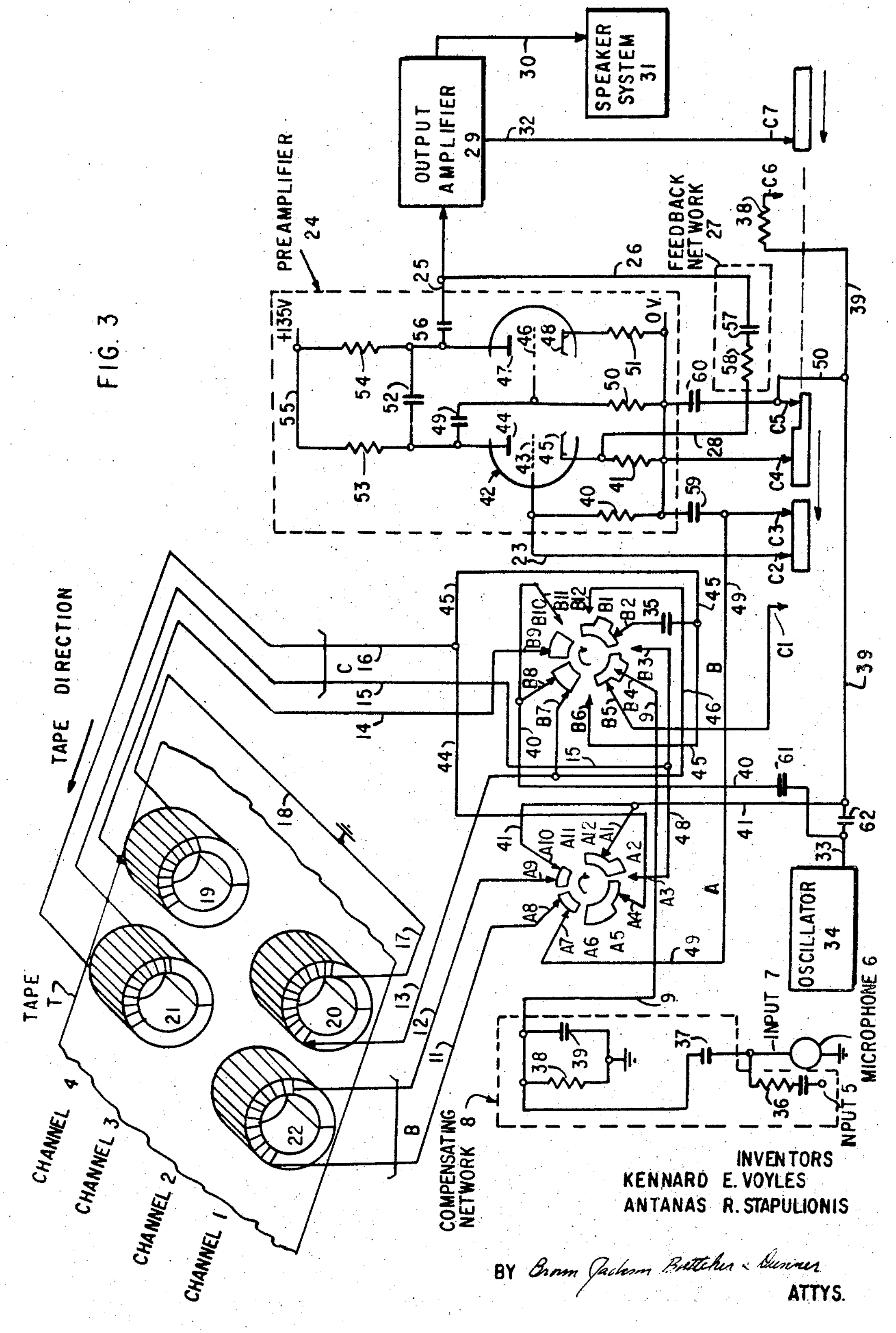

A complete understanding of the method used to achieve these objects can be had by the following description when considered in connection with the following drawings in which:

FIGURES 1A–1F set forth response curves of components in the tape recorder circuit as well as compensation curves provided by the novel circuits of the invention;

FIGURE 2 is a block diagram of the electrical components in a tape recorder utilizing this novel invention; and FIGURE 3 is a schematic diagram setting forth the block diagram of FIGURE 2 in detail.

GENERAL DESCRIPTION

Signal sources may be incompatible for a number of reasons including (1) different frequency characteristics, (2) different impedance levels over all or part of their usable frequency ranges, (3) one source grounded, the other floating, (4) unequal signal amplitudes, and others.

When signals from a microphone and playback head are to be mixed and recorded simultaneously on magnetic tape, all of the above mentioned difficulties are experienced. Thus, for example, the lower frequencies as passed over the playback head commonly need more amplification than its higher frequencies (see FIGURE 1A for example). As there shown, during playback the voltage produced across the playback head is a function of the recorded frequency, and in a typical circuit when the frequency doubles, the output increases approximately 6 db so that the signal level from the playback head at 60 c.p.s. for instance will be about 24 db below the signal level at 1000 c.p.s. As shown in a typical curve (FIGURE 1B) it is known to use a recording current through the head with a rising characteristic to compensate for the fall-off at high frequencies.

Figure 1A:
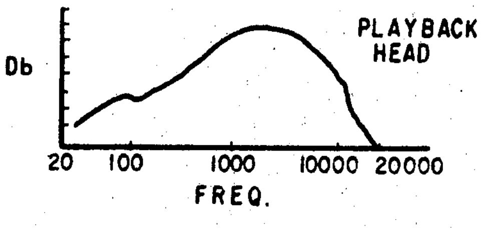
Figure 1D:
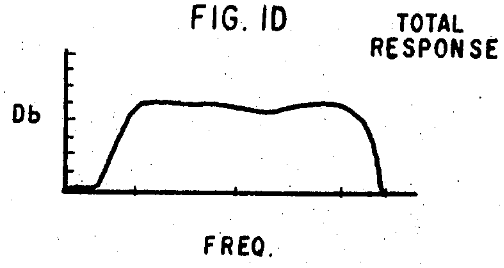
Figure 1B:
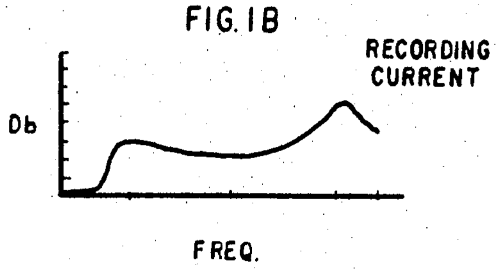
Figure 1E:
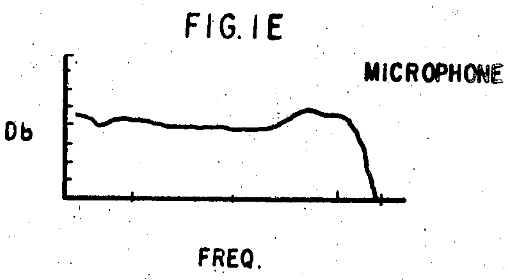
Figure 1C:
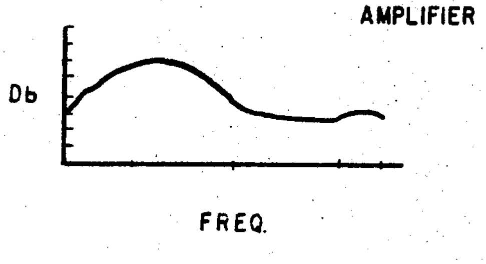

A further degree of frequency compensation is accomplished during playback by passing the head output over an amplifier which provides a large boost in the lower frequencies as shown by the curve of FIGURE 1C which represents a typical playback amplifier response curve for a tape recording system. Such compensation provides a net response which is represented by the curve shown in FIGURE 1D.

In contrast to the requirements for signal compensation in the case of the playback head, the microphone, as shown in FIGURE 1E, has a relatively flat frequency response. Such a response curve needs virtually no compensation during amplification, and if the output signal from the microphone is compensated in the same manner as the signal from the playback head, over emphasis of the low frequencies will result. It is seen from curves 1A and 1E, therefore, that the frequency characteristics of the microphone and playback head are basically different.

Additional difficulties occur in selecting the manner of connection of the microphone and playback head. That is, if the microphone and playback head are arranged in parallel, the microphone output is effectively shunted to ground by the low impedance playback head.

On the other hand, series connection of microphone and playback head will create problems in feedback and bias which do not occur when both signal sources are grounded. For example, if one side of the microphone is connected to ground, and the playback head is connected between the microphone and the input of the preamplifier, the microphone and any associated compensating network provides feedback for the playback head signal. This creates problems in designing the frequency compensating network and also tends to make the system unstable. If the microphone and playback head are placed in parallel, both are grounded but, as previously discussed, the mircophone signal is effectively shunted to ground by the low impedance playback head, unless the amplifier input and microphone are completely redesigned to have a low impedance. This usually requires extra components such as an input transformer or a cathode follower circuit.

A microphone and playback head may also be incompatible because their average signal amplitudes are different. For instance, if a 10 mv. signal from an efficient microphone is mixed with a 2 mv. signal from a playback head, the weaker signal will be almost inaudible compared to the stronger. It would, of course, be possible to simply place a potentiometer in series with the stronger signal and adjust it to equalize both signal levels, but this lowers the signal to noise ratio, and introduces an inherently "noisy" element into the input circuit (i.e., a potentiometer).

As was mentioned before, signals from two incompatible sources have previously been mixed by introducing each of the signals to a different preamplifier stage where the signals are corrected for all the above mentioned defects before mixing.

Differences in impedance levels, grounding, or signal amplitudes between the signal sources are unimportant when two separate preamplifiers are used since these differences are effectively isolated from each other. While the use of two preamplifiers provides an easy solution to the design problems listed above, it also requires many duplicate components which naturally increase the expense, size, and maintenance requirements of the signal mixing apparatus and lower its efficiency.

As will now be set forth, the present invention provides means which make possible the use of a single preamplifier in such equipment.

SPECIFIC DESCRIPTION

With reference now to FIGURE 2, a tape T used to store information on four separate channels numbered 1–4 is shown thereat. Any standard magnetic tape may be used. Although the present invention uses four channels to store information, it will operate equally well when any number of channels is utilized.

It will be recalled that this novel device may be used in the present embodiment to mix the signals from two incompatible sources namely a microphone and playback head. When the tape machine is used in this manner, two of the four tape channels are operative simultaneously. If the tape is in the position shown in FIGURE 2, channels 1 and 3 are used; if the tape is reversed, channels 2 and 4 are operative. A switch circuit 10 selectively couples each of three input circuits lettered A, B and C respectively to the input of a preamplifier 24, the details of the switching circuit being shown in FIGURE 3 and more fully described hereinafter.

Input A comprises a compensating network 8 including two remote input paths 5 and 7 and an output circuit connected over path 9 to switch circuit 10. For purposes of this disclosure, a device having a low voltage output, such as a microphone 6, is connected between remote input 7 and ground potential, while sources with a higher voltage output such as a phonograph or radio are connected to remote input 5.

The microphone 6 is tested to determine its signal amplitude over its usable frequency range, and is matched to the preamplifier and playback head characteristics. Such matching improves the signal to noise ratio. Compensating network 8 contains a resistive capacitive network (shown in detail in FIGURE 3) which changes the frequency characteristics of the microphone signal in such a way that a flat frequency response is achieved after the signal has passed through the preamplifier 24. As will be shown, the network 8 eliminates the need for a separate microphone preamplifier and the compensating network used in previous tape systems. The output of compensating network 8 is connected over path 9 to switch circuit 10.

Input B comprises a combination record-playback head 22 which records or plays back information on channel 1 of tape T when used in the position shown in FIGURE 2. If tape T is reversed, head 22 records or plays back from channel 4. Head 22 is connected over paths 11 and 12 to switch circuit 10.

Input C comprises a record-playback head 21 which records or plays back information on channel 3 of tape T as used in the position shown in FIGURE 2. If tape T is reversed, head 21 records or plays back information on channel 2 of tape T. Head 21 is connected to switch circuit 10 by paths 15 and 16. In summary, head 22 is used on channels 1 or 4, and head 21 is used on channels 3 or 2.

Inputs to switch circuit 10 are also provided for erase head 19 by path 14 and erase head 20 by path 13. Erase head 19 operates with record-playback head 21 on channels 3 or 2 of tape T while erase head 20 is used with record-playback head 22 on channels 1 or 4. When operated, each erase head obliterates previously recorded material and any random noise which may be magnetically stored on the tape.

An oscillator 34 is connected over path 33 to a further input for switch circuit 10. Oscillator 34 operates in a conventional manner to provide a supersonic bias signal for mixing with the audio signal to be recorded in order to lower distortion and noise to tolerable levels. Oscillator 34 provides such a signal at a frequency of 60 kc. in the present embodiment.

The signals from oscillator 34 are also coupled to erase heads 19, 20 to remove previously recorded signals from tape T.

An input is also provided over path 32 to switch circuit 10 by output amplifier 29. During the recording process, switch circuit 10 connects path 32 with oscillator path 33 and the appropriate record head (21 or 22) as will be explained in detail later.

The output of switch circuit 10 is connected over path 23 to the input of preamplifier 24 and the output of preamplifier 24 is connected to the input of amplifier 29 and also over path 26 to feedback network 27 and over path 28 to preamplifier 24.

The preamplifier 24 and feedback network 27 are operative to amplify and frequency compensate signals received from both the microphone 6 and record playback heads 21, 22. In contrast to previous tape recorder systems, only one preamplifier, shown in detail in FIGURE 3, is used.

Output amplifier 29 basically comprises two vacuum tubes, loudness and tone controls, and an output transformer (not shown) which matches hte impedance of the second vacuum tube of the amplifier to the speaker system. The output amplifier arrangement is well known in the art and any equivalent amplifier may be substituted to operate with the present invention.

Speaker system 31 is connected to output amplifier 29 by path 30 and may comprise any appropriate loud speaker system. In the present embodiment a Voice of Music speaker, model V-M 30802, is used; however, another speaker may be substituted if the speaker impedance is matched to the impedance of the output transformer in output amplifier 29.

GENERAL DESCRIPTION OF SYSTEM OPERATION

With reference to FIGURE 2, the operation of the invention will now be discussed. It will be recalled that the present recording system uses two record-playback heads to provide signals for four separate channels on tape T and to provide playback of such signals.

(a) *Playback from channels 1, 3; 2, 4*

If information previously recorded on channel 1 is to be played back, switch circuit 10 is positioned to connect path 12 from head 22 to input path 23 for preamplifier 24 in a manner to be more fully described hereinafter. Then as tape T is moved in the direction shown in FIGURE 2 (a speed of 7½ i.p.s. is chosen in this example) the prerecorded signal is induced in head 22 and conducted through paths 12, 23 to preamplifier 24. The signal is increased in value and frequency compensated by preamplifier 24 and feedback network 27. It will be recalled that the playback frequency response from a playback head increases by about 6 db per octave (i.e., increases 6 db every time the frequency doubles) up to some frequency determined by the tape speed and head gap and then rapidly decreases as shown by FIGURE 1A. Feedback network 27 and preamplifier 24 provide a frequency response which resembles the curve in FIGURE 1D and thereby enable preamplifier 24 to produce signals with equal amplitudes over its entire frequency range.

The compensated signal is then amplified and impedance matched to the speaker system in output amplifier 29. Output path 32 from amplifier 29 and erase heads 19, 20 are used in the recording mode of operation and thus are de-energized with switch circuit 10 in the playback position.

In a similar manner, if information is to be played back from channel 3, switch circuit 10 is operated to connect record-playback head 21 to preamplifier input path 23. A path is then completed from channel 3 through preamplifier 24 and output amplifier 29 to speaker system 31.

If information from channels 2 or 4 is to be played back, the tape must be reversed so that these two channels are placed under playback heads 21 and 22. To obtain information from channel 4, switch circuit 10 is adjusted to connect playback head 22 to preamplifier input path 23. Information from channel 2 is obtained by connecting head 21 in a similar manner.

(b) *Recording channels 1, 3; 2, 4*

Assuming tape T is oriented as shown in FIGURE 2 and information is to be recorded on channel 1, playback head 22 is connected to oscillator 34 and output amplifier 29. That is, paths 11, 33 and 32 are joined together, and a path 12 is connected to ground in switch circuit 10. The signals to be recorded are connected to remote inputs 5 or 7 and conducted through compensating network 8 to switch circuit 10. Input 5 is provided for sources with a relatively high output voltage such as a radio or phonograph while input 7 is used for low voltage sources such as microphone 6.

Compensating network 8 attenuates the low frequencies of the source (see FIGURE 1F) so that when the signals are passed through preamplifier 24, all frequencies will have an equal amplitude, and the need for the separate signal source preamplifier found in previous systems is eliminated. Switch circuit 10 also connects path 9 of input A to preamplifier 23 and thus completes a path from remote input 6 through compensating network 8, preamplifier 24 and output amplifier 29 to record head 22. Switch circuit 10 also connects oscillator 35 over paths 13 and 34 to erase head 20. It will be recalled that oscillator 34 is connected to head 22 to provide supersonic bias for the recorded signal and to erase head 20 to remove any previously recorded signal.

In a similar manner signals are recorded on channel 3 of tape T by connecting record head 21 to output amplifier 29 over paths 32, 15, and by connecting path 16 to ground. Oscillator 34 is connected to record head 21 over paths 33, 15, and to erase head 19 over paths 33, 13.

Assuming information is to be recorded on channels 2 and 4, tape T is reversed and connections are made as heretofore described. That is, when channel 4 is utilized, the connections previously described for channel 1 are used, and when channel 2 is recorded the connections are the same as those previously described for channel 3.

(c) *Recording two signal sets on one tape channel which are obtained from two different sources*

It will be remembered that it is a principal object of this invention to provide a system which is capable of mixing and recording signals from two incompatible sources by using only one preamplifier, whereby the advantages of size, simplicity, and trouble-free operation are obtained.

The operation of the present system requiring only one preamplifier will now be explained assuming that signals prerecorded on channel 3 are to be mixed with signals from a microphone and rerecorded on channel 1 of tape T. One typical use of the tape recorded in this mode of operation is the mixing of instrumental and vocal sounds on a signal tape channel. For example, a singer may record the accompaniment part of a song and then at a later time, play back the accompaniment and provide the missing vocal part of the song by singing into a microphone. Both the vocal and instrumental sounds are then mixed and rerecorded on a single tape channel.

Assuming instrumental music has been previously recorded on channel 3 of tape T, and a singer wishes to combine the vocal and instrumental parts of the music, a microphone 6 is connected to remote input 7. Switch circuit 10 is operated to connect compensating network 8 through record-playback head 21 to preamplifier 24. That is, a path is completed from remote input 7 through compensating network 8, paths 9, 15, head 21, and paths 14, 23 to preamplifier 24. Since information is to be played back from channel 3, erase head 19 is deenergized by switch circuit 10.

In that the mixed signals are to be recorded on channel 1, a path is also completed from preamplifier 24 through output amplifier 29, path 32, switch circuit 10, and path 12 to record-playback head 22.

Oscillator 34 is also connected over paths 33 and 12 to head 22 and is connected over paths 33 and 13 to erase head 20. When tape T is operated to move in the direction shown in FIGURE 2, signals from channel 3 induce similar voltage signals in playback head 21 which are conducted to preamplifier 24. The signals are amplified and frequency compensated in preamplifier 24 and increased in amplitude in amplifier 29 as previously described. The signals then follow two paths. The first path extends over conductor 30 to speaker system 31 to enable the vocalist to hear the instrumental music recorded on channel 3. The record path extends over conductors 32, 11, and 12 to record head 22 to provide means for rerecording the music on channel 1.

As long as no sound is made by the singer, the signals recorded on channel 3 are transferred to channel 1 without change. When the vocalist begins to sing, however, microphone 6 creates an electrical signal which passes through playback head 21 and is there mixed with the signal induced by the prerecorded instrumental music on channel 3. Compensating network 8 attenuates the low frequencies in the microphone signal in such a way that when the signal has passed through preamplifier 24 which has a frequency response curve similar to the curve shown in FIGURE 1C, all frequencies in the audio range have approximately the same amplitude (see FIGURE 1D). The problems previously discussed due to changes in impedance and differences in ground connections are also corrected by network 8.

It is apparent that when signals are produced by microphone 5 and playback head 21, two properly matched signals are conducted simultaneously to record head 22 through preamplifier 24 and output amplifier 29. Consequently, both the vocal and instrumental parts of the music are recorded on channel 1.

SPECIFIC DESCRIPTION OF SYSTEM OPERATION

Referring now to FIGURE 3, compensating network 8, switch circuit 10, preamplifier 24, and feedback network 27 are set forth, and the specific connections of such components in the various modes is set forth in detail.

As there shown, compensating network 8 comprises a capacitor 35 and resistor 36 connected between remote input 5 and remote input 7; a capacitor 37 connected in series between remote input 7 and conductor 9; and a resistor 38 and capacitor 39 connected in parallel from conductor 9 to ground potential.

Preamplifier 24 basically comprises a double triode vacuum tube 42. Tube 42 has a grid 43 connected to switch circuit 10 through path 23 and to ground through resistor 40; a cathode connected to ground through resistor 41 and to feedback network 27 by path 28; and a plate connected (a) through capacitor 49 to grid 46, (b) through capacitor 49 and resistor 50 to ground, (c) through capacitor 52 to plate 47, and (d) through resistor 53 to +135 volt supply conductor 55. Tube 42 also has a grid 46 connected between capacitor 49 and resistor 50; a cathode 18 connected through resistor 51 to ground; and a plate 47 connected (a) to plate 44 as previously described, (b) through capacitor 56 and path 25 to output amplifier 29, (c) through capacitor 56 and paths 25, 26 to feedback network 27, and (d) through resistor 54 to the +135 volt supply conductor 55.

Feedback network 27 comprises a resistor 58 and capacitor 57 connected in series between paths 28 and 25.

(a) *Playback from channels 1, 4*

The operation of these circuits will now be explained in detail. It will be remembered that during playback when information is obtained from channels 1 or 4, record playback head 22 is connected to the preamplifier 24. More specifically, path 11 is connected to path 23, and paths 33, 13 and 12, as will be shown, are grounded. In this mode of operation, prerecorded signals on channel 3 of tape T induce similar voltages in head 22 which are conducted to grid 43 on tube 42. The amplified signals in tube 42 are conducted over a first path which extends from plate 44 through capacitor 49 to grid 46 in the second section of tube 42, and plate 47 through capacitor 56 to amplifier 29.

Switch circuit 10 comprises a three position rotary switch with A, B, sections and a two position sliding switch C. When used, as shown in FIGURE 4, switch circuit 10 is used to play back the information on channels 1 or 4 depending on how tape T is placed in the machine. As can be seen in FIGURE 3, playback head 22 is connected to grid 43 of tube 42 over a path comprising conductor 11, contacts A8, A7 on switch section A, conductor 49, contacts C3, C2 on switch C, and conductor 23. The opposite side of head 22 is grounded over a path comprising conductor 12, contacts A9, A10, conductors 41, 39, 50 and contacts C5, C4. Erase head 20 is short circuited and heads 21 and 19 are disconnected by contacts on sections A and B of switch circuit 10.

When used in the playback mode, as shown in FIGURE 3, switch C connects oscillator 34 to ground through path 33, capacitor 62, paths 39, 50, and contacts C5, C4.

Assuming switch sections A and B are in the positions shown in FIGURE 3 and switch C is in its first position to the right, playback head 22 is connected to the input of preamplifier 24 as previously described. Assuming further that signals have been previously recorded on channel 1 and that it is advanced in the direction shown in FIGURE 3, voltage signals representing the prerecorded signals are induced in head 22 and conducted to grid 43 of tube 42 as previously described. Tube 42 amplifies the signals by different amounts depending on their frequencies due to the operation of feedback network 27 which provides a larger value feedback signal for high frequencies than for low frequencies to the cathode circuit of tube 42 (see FIGURE 1C). If the proper values are chosen for resistors 58, 41 and capacitor 57, the lower frequencies are amplified more than the higher ones and a response curve similar to the left hand portion of the curve in FIGURE 1C is obtained. In this embodiment resistor 58 is 220,000 ohms, resistor 41 is 2,200 ohms, and capacitor 57 is 1,000 picofarads.

The output signal from tube 42 which appears on plate 44 follows two paths as previously noted. Most of the signal flows through a first voltage dividing path comprising capacitor 49 and resistor 50. It will be noted that capacitor 49 presents a relatively high impedance to a low frequency signal and consequently only a portion of a low frequency voltage signal appearing on plate 44 will be conducted to grid 46 by the voltage divider. Conversely, capacitor 49 presents a low impedance to a high frequency signal so that most of a high frequency voltage signal appearing on plate 44 is conducted to grid 46. It is apparent that a larger signal is conducted to grid 46 for high frequencies than for low ones, and therefore the output signal to output amplifier 29 will be greater for higher frequencies. At first glance this might seem to counteract the operation of feedback network 27 which boosts the bass frequencies. In practice there is no interference of operation, however, since network 27 and capacitor 49, resistor 50 operate at two different portions of the frequency response curve. In the present embodiment capacitor 52 is 47 picofarads, capacitors 49 and 56 are .01 microfarad, and resistor 50 is 470,000 ohms.

The output signal at plate 47 passes through capacitor 56 to output amplifier 29. As can be seen from FIGURE 3, a small portion of the output signal is fed back to tube 42 by network 27 in the manner previously described.

Output amplifier 29 increases the value of the signals which then pass to speaker system 31 and are converted to sound. Since, in the present example, the recorder is being operated in the playback mode, switch C is positioned to the right so that no signal passes through output conductor 32.

(b) *Recording on channels 1, 4*

When signals are to be recorded on channel 1 or 4, switch sections A and B remain in the position shown in FIGURE 4, and switch C is moved to its second position to the left. Switch C then connects inputs 5 and 7 to grid 43 of tube 42 over a path comprising network 8, conductor 9, contacts B4, B5, conductor 48, contacts C1, C2 and path 23. Record playback head 22 is connected to the output amplifier 29 over path 12, contacts A9, A10, paths 41, 39, resistor 38, contacts C6, C7, and path 32. The other side of record head 22 is connected to ground over a path comprising conductor 11, contacts A8, A7, conductor 49, and contacts C3, C4. It will be noted that oscillator 34 is connected to head 22 over path 33, capacitor 62, path 41, contacts A10, A9, and path 12; and is connected to erase head 20 over path 33, capacitor 61, path 40, contacts B8, B7, and path 13. As in the playback mode of operation, heads 21 and 19 are disconnected.

In recording, signals are provided by microphone 6 which, it will be recalled, has a relatively flat frequency response curve. Since preamplifier 24 provides a response curved such as shown in FIGURE 1C, the microphone signal would be badly distorted if it were allowed to enter preamplifier 24 unaltered. Consequently compensating network 8 is operative to alter the microphone signals in such a way that a flat frequency response curve is obtained after the microphone signals have passed through preamplifier 24. If the proper values are chosen for capacitors 37, 38, and resistor 39, the low and very high frequencies are attenuated so that the output signal from circuit 8 is approximately like the curve of FIGURE 1F. In this embodiment, capacitor 37 is 5,000 picofarads, capacitor 39 is 390 picofarads, resistor 38 is 47,000 ohms.

The signals then pass to grid 43 of tube 42 as previously described and are amplified in the same manner as the playback signals from head 22. The output amplifier further increases the value of the signals which then divide and follow two paths. In the first path, a portion of the signals are conducted to the speaker system and converted to sound. In the second path, part of the signals are conducted to record-playback head 22 as previously described and are there converted to magnetic field signals on tape T. Since the tape is moving in the direction shown in FIGURE 3, the tape passes under erase head 20 before it receives signals from head 22. In a manner previously described, erase head 20 is connected to oscillator 34 and is effective to remove all prerecorded signals from tape T.

(c) *Playback from channels 2, 3*

If signals are played back from channel 2 or 3 on tape T, switch C is returned to its first position at the right, and switch sections A and B are rotated one position clockwise. Playback head 21 is then connected to the input of the preamplifier 24 over a path comprising conductors 16, 44, contacts A4, A7, conductor 49, contacts C3, C2, and conductor 23 to the grid of tube 42 (first section). In this mode of operation, erase head 19 is short circuited, and heads 22 and 20 are disconnected. As previously described, oscillator 34 is connected to ground over contacts C5, C4.

(d) *Recording on channels 2, 3*

When signals are to be recorded on channel 2 or 3, switch sections A and B remain in the positions previously described, that is, one position clockwise from the position shown in FIGURE 3; and switch C is moved to the left to its second position. Inputs 5 and 7 are connected to preamplifier 24 as previously described, and the output of output amplifier 29 is connected to record head 21 over a path comprising conductor 32, contacts C7, C6, resistor 38, conductors 39, 41, contacts A1, A3, and conductors 48, 15, the winding on coil 21, conductor 16, conductor 44, contacts A4, A7, conductor 49, contacts C3, C4, to ground. Oscillator 34 is also connected to head 21 by path 33, capacitor 62, path 41, contacts A1, and paths 48, 15 to head 21. Oscillator 34 is further connected to erase head 19 over path 33, capacitor 61, path 40, contacts B8, B9, and path 14 to the coil on head 19 and conductor 18 to ground. Heads 22 and 20 are disconnected, as will be apparent from the switch position.

*Recording on channel 1 of signals from microphone 6 mixed with signals from channel 3*

When signals prerecorded on channel 3 are to be mixed with signals from a second source, such as microphone 6, switch C remains in its second position at the left, and switch sections A and B are rotated two positions clockwise from the position shown in FIGURE 3. Then amplifier 29 energizes record-playback head 22 over a path comprising conductor 12, contacts A9, A10, conductors 41, 39, resistor 38, contacts C6 and C7, and conductor 32, the winding of head 22 and over conductor 11, contacts A8, A7, conductor 49, and contacts C3, C4 to ground. Oscillator 34 energizes erase head 20 over path 33, capacitor 61, path 40, contacts B11, B12, and paths 46, 13 over coil 20 and conductor 17 to ground; and further energizes head 22 over path 33, capacitor 62, path 41, contacts A9, A10, path 12, the coil of head 22 and over conductor 11, contacts A8, A7, conductor 49, and contacts C3, C4 to ground.

Microphone 6 is connected to grid 43 through record-playback head 21 by a path consisting of capacitor 37, conductor 9, contacts B4, B3, conductor 15, head 21, conductors 16, 45, contacts B6, B5, contacts C1, C2 and conductor 23. Erase head 19 is disconnected.

Figure 1F:
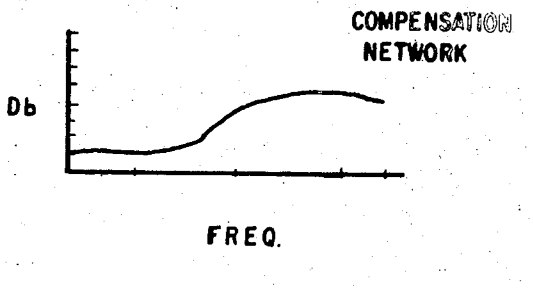

In the present mode of operation, tape T is moved in the direction shown in FIGURE 3 at 7½ i.p.s. in this example. One set of signals is produced by microphone 6 and is attenuated by compensating network 8 in the same manner as during the record mode of operation. That is, the signal attenuation approximately corresponds to the curve of FIGURE 1F. The microphone signals then pass through head 21 which is also having signals induced in it from channel 3 of tape T, and both signals are subsequently conducted to grid 43 of tube 42. Since the signal output from the head 21 (FIGURE 1A) during recording is compensated by the recording current as shown in FIGURE 1B and the signal output of microphone 6 (FIGURE 1E) is compensated as shown in FIGURE 1F, the output of preamplifier 24 will be a flat response curve as shown in FIGURE 1D.

The signals are then increased in value by output amplifier 29 and subsequently follow two paths. In the first path, the signals enter the speaker system and are converted to sound; in the second path both sets of signals are conducted to playback-record head 22, as previously described, and are converted to magnetic impulses on tape T.

While certain preferred embodiments of the invention have been shown and described herein, it is apparent that modifications and alterations may be made which include the basic concepts of the invention, and it is intended in the appended claims to cover all such modifications and alterations as may fall within the true spirit and scope of the invention.

What is claimed is:

1. In a tape recording system having a tape for recording signals on a plurality of channels, pickup means for deriving signals from one of said channels, said pickup means having increased signal outputs for increasing frequencies, signal source means for providing additional signals including input means having a relatively flat response, and a first compensating circuit connected to said input means to attenuate the lower frequency signals provided by said input means, an amplifier circuit including a second compensating circuit for providing an increased signal output for lower frequencies, and switching means for connecting the output of said first compensating circuit and the signal output of said pickup means directly to said amplifier circuit without prior amplification.

2. In a tape recording system having a tape for recording signals on a plurality of channels, pickup means for deriving signals from one of said channels, said pickup means having increased signal outputs for increasing frequencies, microphone means having a relatively flat response for providing additional signals including a first compensating circuit connected to the output of said microphone to attenuate lower frequency signals provided by said microphone, a single preamplifier stage having a common input circuit for recording signals from said pickup means and said microphone means including a second compensating circuit for providing increased signal output for lower frequencies, a recording head for a second channel on said tape, and switching means including means for connecting the output of said compensating circuit and the signal output of said pickup means without amplification directly to the common input of said single preamplifier stage, and means for connecting the output of said single stage preamplifier circuit to said recording head.

3. A system as set forth in claim 2 which includes speaker means, and means for also connecting the output of said preamplifier circuit to said speaker means.

4. In a tape recording system having a tape for recording signals on a plurality of channels, pickup means for deriving signals from one of said channels, said pickup means having increased signal outputs for increasing frequencies, signal source means including a microphone having a relatively flat response and a first compensating circuit connected to the output of said microphone to attenuate lower frequency signals received over said microphone, comprising a series capacitor, and a parallel connected resistor-capacitor circuit, an amplifier stage having an input including a second compensating circuit for providing increased signal output for lower frequencies, and switching means for connecting the output of said first compensating circuit and the signal output of said pickup means without amplification directly to said input circuit for said amplifier stage.

5. In a tape recording system having a tape for recording signals on a plurality of channels, pickup means for deriving signals from one of said channels, said pickup means having increased signal outputs for increasing frequencies, signal source means including a first input means for connection to units having a low voltage output, and a second input means for connection to units having a higher voltage output and a first compensating circuit connected to attenuate lower frequency signals provided by said first and second input means, a single amplifier circuit including a second compensating circuit for providing increased signal output for lower frequencies, and switching means for simultaneously connecting the output of said first compensating circuit and the signal output of said pickup means directly to said amplifier circuit without prior amplification.

6. In a tape recording system having a tape for recording signals on a plurality of channels, pickup means for deriving signals from one of said channels, said pickup means having increased signal outputs for increasing frequencies, signal source means for providing additional signals including input means having a relatively flat response and a first compensating circuit connected to the output of said input means to attenuate the lower frequency signals provided by said input means, an amplifier circuit including an amplifier device having a first control element and a resistance capacitor series circuit connected to said control element, and switching means for connecting the output of said first compensating circuit to said control element and for simultaneously connecting the signal output of said pickup means over said series circuit to said control element.

7. A system as set forth in claim 6 in which said amplifier device includes a second control element, and said resistor member in said series circuit is connected between said first and second control elements.

References Cited

Burstein: Elements of Tape Recorder Circuits, 1957, pp. 12, 19.

BERNARD KONICK, *Primary Examiner.*

H. STECKLER, *Assistant Examiner.*